United States Patent
Vaughan et al.

(10) Patent No.: US 10,152,899 B2
(45) Date of Patent: Dec. 11, 2018

(54) METHOD AND SYSTEM FOR MEASURING COMMUNICATION SKILLS OF CREW MEMBERS

(71) Applicant: Crewfactors Limited, Dublin (IE)

(72) Inventors: Brian Vaughan, Dublin (IE); Celine De Looze, Dublin (IE)

(73) Assignee: Crewfactors Limited, Dublin (IE)

( * ) Notice: Subject to any disclaimer, the term of this patent is extended or adjusted under 35 U.S.C. 154(b) by 249 days.

(21) Appl. No.: 14/909,044

(22) PCT Filed: Jul. 31, 2014

(86) PCT No.: PCT/EP2014/066533
§ 371 (c)(1),
(2) Date: Jan. 29, 2016

(87) PCT Pub. No.: WO2015/014956
PCT Pub. Date: Feb. 5, 2015

(65) Prior Publication Data
US 2016/0189562 A1 Jun. 30, 2016

(30) Foreign Application Priority Data
Aug. 1, 2013 (EP) .................................. 13178908

(51) Int. Cl.
G09B 19/00 (2006.01)
G09B 5/04 (2006.01)

(52) U.S. Cl.
CPC ............... *G09B 19/00* (2013.01); *G09B 5/04* (2013.01)

(58) Field of Classification Search
CPC .................................. G09B 5/04; G09B 19/00
See application file for complete search history.

(56) References Cited

U.S. PATENT DOCUMENTS

| 7,831,426 B2 * | 11/2010 | Bennett | G06F 17/27 704/252 |
| 2002/0049594 A1 * | 4/2002 | Moore | G10L 13/04 704/258 |

(Continued)

FOREIGN PATENT DOCUMENTS

WO    WO 2015/014956 A1    2/2015

OTHER PUBLICATIONS

"Investigating automatic measurements of prosodic accommodation and its dynamics in social interaction", written by De Looze et al., published on or before Oct. 30, 2013, accessible and printed from URL <http://www.sciencedirect.com/science/article/pii/S0167639313001386>, 24 pages (pages numbered from 11 to 34).*

(Continued)

*Primary Examiner* — Jason Skaarup
(74) *Attorney, Agent, or Firm* — Hamilton, Brook, Smith & Reynolds, P.C.

(57) ABSTRACT

A training tool, method and a system for measuring crew member communication skills are disclosed, wherein an audio data processing terminal interfaced with a crew training apparatus, typically a crew-operated vehicle simulator. Audio data corresponding to a conversation between at least two crew members is recording during a training session and stored. Respective audio data of each crew member is extracted from the stored audio data, and a series of measures for at least one prosodic parameter in each respective audio data extracted is computed. A correlation coefficient of the series of measures is then computed, wherein the correlation coefficient is indicative of a level of prosodic accommodation between the at least two crew members. Specific communication skills in addition to prosodic accommodation performance can the be determined inferred.

16 Claims, 6 Drawing Sheets

(56) References Cited

U.S. PATENT DOCUMENTS

| | | | | |
|---|---|---|---|---|
| 2005/0010414 | A1* | 1/2005 | Yamazaki | G10L 13/04 704/266 |
| 2011/0270605 | A1 | 11/2011 | Qin et al. | |
| 2012/0089396 | A1* | 4/2012 | Patel | G10L 25/00 704/249 |
| 2016/0093289 | A1* | 3/2016 | Pollet | G10L 13/027 704/260 |

OTHER PUBLICATIONS

Notification of Transmittal of the International Search Report and the Written Opinion of the International Searching Authority, or the Declaration, for International Appl. No. PCT/EP2014/066533, dated Oct. 22, 2014, consisting of 8 pages, entitled "Method and System for Measuring Communication Skills of Crew Members".

* cited by examiner

METHOD AND SYSTEM FOR MEASURING COMMUNICATION SKILLS OF CREW MEMBERS

This application is the U.S. National Stage of International Application No. PCT/EP2014/066533, filed Jul. 31, 2014, which designates the U.S., published in English, and claims priority under 35 U.S.C. §§ 119 or 365(c) to EP Application No. 13178908.3, filed Aug. 1, 2013. The entire teachings of the above applications are incorporated herein by reference.

FIELD

The invention relates to a system and method for measuring communication skills of a plurality of crew members based on their respective voice data, in training and operational environments (mission/safety critical environments).

BACKGROUND

Conversational interactions are joint and dynamic activities where all participants are engaged in the construction of meaning and in the establishment and maintenance of social relationships. Conversations take place according to a cooperation principle for which participants constantly adjust, accommodate or coordinate their behavior with that of their conversational partner. It has been observed in many studies that, over the course of a conversation, speakers adopt similar facial expressions, body postures and gestures, and adapt their way of speaking to that of their interlocutor at different linguistic levels: semantic, syntactic, phonological, phonetic and prosodic.

Prosodic accommodation relates to how speakers adapt their prosodic characteristics to one another as pitch range, speech rate, voice intensity, intonation, rhythm and voice quality, with conversational partners tending to exhibit similar pitch, intensity, speech rate and timing. Accommodation mechanisms variously described as convergence, alignment, entrainment, synchrony, mimicry and the 'chameleon effect' constantly arise in conversations and play an important role in social interaction. They allow individuals to understand each other and participate in expressing and recognizing speakers' emotional states and rapport within the frame of the interaction. If cognitive, psychological or physiological impairments prevent such mechanisms, for instance under circumstances of high-stress environments or a lack of linguistic knowledge, difficulties in interacting may arise and may therefore affect the quality of the interaction, especially in terms of the exchange of information and inter-personal relationships.

US patent publication number US2011/270605, Qin Yong et al, discloses a computer implemented method to perform assessment of rhythm. This disclosure only covers the notion of fluency in a way related to rhythm, which is one of the many components of prosody. The fluency/rhythm assessment is based on rules defined in the disclosure based on a reference speech database. Fluency/rhythm rules include pitch reset, pauses, hesitations and final lengthening (as another hesitation type). Overall, the US publication is directed to assess fluency/rhythm accuracy from a speech input (read speech or spontaneous speech) according to standards (a speech database). It states to cover many languages and speaking styles (reading, spontaneous speech). This US patent publication is not suitable for providing a measure of prosodic accommodation between two or more crew members operating in a team environment.

Being able to communicate efficiently has been acknowledged as a vital skill in many different domains. In particular, crew communication skills have been highlighted as a core challenge in the operation of complex machinery such as aircrafts, maritime vessels and such other, highly-specialized, civilian or military vehicles, as well as the performance of complex tasks in the medical domain.

The ability to work together with partners of a crew has been pointed out as an essential skill to enhance communication and information exchange and to improve crew effectiveness and cohesiveness. In this context, communication skills training programs have become widespread over the past decade, with the military and aviation communities in particular having made large investments in this field for better understanding the benefits derived from improved crew skills.

For instance, with reference to the specific field of aircraft operational training, the technical and operational parameters of aircrafts are well understood and defined: aircrafts contain complex data measuring and processing systems for tracking and recording operational parameters, and check that they are maintained within defined parameters in order to identify possible operational or technical errors. Whilst pilots are required to have the technical knowledge to fly and manage their aircraft, they are also required to have effective communication skills in order to operate safely and efficiently in a mission-critical environment. Pilot error is the cause of the majority of commercial aviation incidents and accidents, thus effective communication skills need to be maintained in flight to ensure that no operational errors can occur can occur due to a lack of understanding or communicative deterioration between a pilot and the rest of the crew, particularly a co-pilot.

Accordingly, numerous training protocols exist to train pilots and crew in the non-technical aspects of flying a plane: Multi Crew Co-operation (MCC), Jet Orientation Course (JOC) and Crew Resource Management (CRM). These training protocols are subjectively assessed by trainers, with no method of objective measurement being currently possible and wherein subjectivity lies in the fact that different trainers and training schools may give different results.

A main difficulty thus lies in both how to evaluate crew communication skills in simulation-based training, and what criteria to evaluate. Some researchers have proposed to evaluate both crew performance and crew effectiveness. The first concept refers to the behavioral cognitive and affective processes which crews engage in for coordinating their interactions toward shared goals. The second concept corresponds to the results, or 'success', of the performance. In this dual conceptualization, it is proposed that evaluations should not only capture the outcome of crew performance, but also how the crew achieves the outcome. In terms of crew performance, it specifically deals with how individuals within a crew dynamically adjust, coordinate and align their behavior to one another. Many studies have considered and discussed the importance of good communication skills, in particular in the aviation community, but none have mentioned and raised the importance of prosodic accommodation.

No technologies are believed to exist, which make use of prosodic accommodation data for providing objective ratings of crew, such as pilot crew, communication skills. Whilst voice analysis is a well-known field of audio data processing and research, the primary focus is habitually on the voice of a singular person, with little or no consideration given to how the respective voices of two or more crew members talking may change and adapt in relation to each other over the course of a conversation, particularly during the prosecution of a shared objective or task. Moreover, current CRM techniques do not provide a detailed temporal breakdown of the training outcome and results; rather, a general, and thus more subjective and imprecise, overview is given to the trainees, rendering their learning and progress more difficult. Currently, communication skills are subjectively evaluated by human experts. Human evaluation is in nature subjective and therefore may be challenged by many factors (e.g. trainer's fatigue, perception of the trainee) that an objective evaluation is impervious to. The changes in the prosody of two or more interlocutors is often subtle, and dynamic, occurring, to various degrees over the course of the interaction, and It is not possible for a human to accurately recognise and process these discrete changes for any prolonged period of time. At most, humans can recognise individual moments of large scale prosodic changes (e.g. a large change in pitch or intensity, or a large change in the articulation rate).

A new technical method and system for objectively assessing communication skills of crew members is thus proposed, based on prosodic accommodation levels and which mitigates the risk of at least the above problems.

SUMMARY

The technology provides an objective rating of how two or more people are communicating as set out in the appended claims. Specifically, it aims to provide an objective rating of how well crew members are communicating in a training and/or operational environment. It does so by measuring the way they adapt their voice (e.g. tone of voice, rhythm) to one another, according to the principles of prosodic accommodation.

Using audio recordings of vocal interaction between at least two crew members during a simulation-based training event and/or operational environments, the invention measures crew members' prosodic parameters and computes a level of prosodic accommodation between the two. The output is a rating for each of the at least two crew members and a joint rating for the two together, which is representative of their ability to adapt vocally to one another and of their cooperating effort towards achieving one or more specific goals, for instance the simulation target.

Accordingly, in a first aspect of the present invention, a method of measuring crew member communication skills with an audio data processing terminal interfaced with a crew training apparatus is provided, comprising the steps of recording and storing audio data corresponding to a conversation between at least two crew members during a training session; extracting respective audio data of each crew member from the stored audio data; computing a series of measures for at least one prosodic parameter in each respective audio data extracted; computing a correlation coefficient of the series of measures, wherein the correlation coefficient is indicative of a level of prosodic accommodation between the at least two crew members. The correlation coefficient is computed at different time intervals, providing both global and dynamic measurements of prosodic accommodation between the crew members; inferring levels of communication skills (such as crew quotient, communication performance, coordination, cooperation, crew balance, individual effort, active listening, dominance, adaptability, leadership/followership, stress recovery, interpersonal relationship, group climate) from the different metrics computed in previous steps; and displaying communication performance in an interactive and user-friendly environment using a graphical and/or audio user interface.

It will be appreciated that that the invention enables the measurement of prosodic accommodation to provide an objective evaluation of team communication skills. In one embodiment the method comprises the steps of (1) recording audio data of crew members interacting while performing a specific task, (2) extracting prosodic measurement (e.g. pitch, intensity, duration) for each team member, (3) computing a series of measures from the extracted prosodic features (e.g. descriptive statistics such as median of fundamental frequency for a specific time domain), (4) computing prosodic accommodation levels between at least two crew members from the series of measures obtained for each speaker (e.g. using Spearman correlation coefficient); (5) inferring levels of communication skills based on the computed metrics from step using statistical modeling techniques.

In the present invention, individual performances are not matched against pre-recorded non-technical prosodic parameters. Prosodic characteristics are obtained in the same time for each team member. The characteristics are then aligned to compute a level of accommodation between the two (or more) crew members. The invention is about using prosodic accommodation of individuals' vocal performance to infer a level of communication skills using a technical solution. Trainers cannot measure prosodic accommodation between crew members, therefore they cannot assess a crew member communication using prosodic accommodation. The invention provides critical data in a technical manner to a trainer to complement his or her own evaluation of individuals' communication skills/performance; or that a trainee may use the results from the method and system to get an overview of their communication skill evolution within and over different training sessions. The invention enables measuring objectively the levels of crews' and individuals' communication skills allows to compare, monitor and improve individuals' performance. In sectors like Aviation and Medicine, assessing communication performance is critical as safety not only depends on individuals' technical skills but on their non-technical skills. It is for instance a recognized fact that over 70% of aviation accidents are due to pilot error, usually through miscommunication. The invention can provide objective metrics of an individual's communication that can be used to act upon it, in order to reduce errors arising from it and thereby solving a technical problem that exists in the art.

In accordance with tenets of prosody, at least one prosodic parameter in the method is preferably selected from the group of voice characteristics, comprising crew member voice pitch level and span, voice intensity level, time spent talking/silent and time spent overlapping. It will be appreciated that other prosodic parameters can be used.

In various embodiments of the method according to the invention, the one or more prosodic parameters may be extracted from the conversation data according to techniques that are specific to the nature or character of the parameter. For instance, a voice pitch level of each crew member may be extracted by calculating the F0 median of the respective audio data, given on a linear scale such as a signal frequency (Hertz). Likewise, a voice span of each crew member may be extracted by calculating the log 2 (F0 max−F0 min) of the respective audio data, given on a logarithmic scale such as a signal pitch (octave). Further, the voice intensity of each crew member may be extracted by calculating the root mean square amplitude and standard deviation of the respective audio data.

An embodiment of the method according to the invention may comprise the further step of normalising the respective audio data by a log operation and an additional z-score transformation, in order to best account for speaker differences in pitch level and span, number and mean duration of pauses as well as voice intensity.

In an embodiment of the method according to the invention, the step of computing the series of measures may comprise the further step of periodically sampling the respective audio data in a moving time window. This further step advantageously minimises the frequent absence of time-alignment of the data when measuring prosodic accommodation, so as to extract prosodic cues for each speaking crew member at a same periodical interval, for instance every 1, 2, 5 or 10 seconds. It will be appreciated that other methods to the TAMA can be used. In a hybrid method to the TAMA method based on the TAMA method, it advances it and ensures that conversational moments between speakers is not truncated as with the TAMA method. In tests we found there was little or no difference between them in terms of results. The Hybrid method is discussed in a Journal paper published in March 2014 entitled 'Investigating automatic measurements of prosodic accommodation and its dynamics in social interaction'.

In an embodiment of the method according to the invention, the step of computing the series of measures may comprise the further step of periodically sampling the respective audio data at different time intervals. This further step advantageously minimises the frequent absence of time-alignment of the data when measuring prosodic accommodation, so as to extract prosodic cues for each speaking crew member at a same periodical interval, for instance every 5 or 10 seconds. In case of missing values for one crew member, interpolated values can be computed or the computation of prosodic accommodation adjusted (e.g. using spearman's coefficient).

An embodiment of the method according to the invention may comprise the further step of triggering at least one simulated event in the crew training apparatus for causing event-related conversation between the at least two crew members. Aligned with specific events timing, the correlation coefficient indicative of the level of prosodic accommodation allows a trainer operating the training event, and/or the crew partaking in the training event, to examine the individual and crew performance levels at these specific, triggered events, for instance in stressful situations.

An embodiment of the method according to the invention comprises providing overall rating for the whole interaction as well as ratings at specific anchor points of the interaction. Ratings at different time intervals allow the visualisation and screening of crew performance level dynamics throughout the interaction.

According to another aspect of the present invention, there is also provided a system for measuring crew member communication skills, comprising a crew training apparatus having audio capturing means; a data processing terminal interfaced with at least the audio capturing means and further comprising audio signal processing means for recording and storing audio data corresponding to a conversation between at least two crew members during a training session; and means for extracting respective audio data of each crew member from the stored audio data, for computing a series of measures for at least one prosodic parameter in each respective audio data extracted, and for computing a correlation coefficient of the series of measures, wherein the correlation coefficient is indicative of a level of communication skills between the at least two crew members.

An embodiment of the system according to the invention may further comprise a network over which the crew training apparatus and the data processing terminal are connected to one another. This embodiment advantageously allows a same data processing terminal to perform crew communication skill measurements for a plurality of geographically-dispersed crew training apparatuses, and to extend the benefit of the present technique, effectively retro-fitting same, to any network-enabled crew training apparatus.

In accordance with tenets of prosody, at least one prosodic parameter in the system is preferably selected from the group of voice characteristics comprising crew member voice pitch level, crew member voice span, crew member voice intensity, speaking, listening and overlapping time.

An embodiment of the system according to the invention may further comprise a user interface adapted to trigger at least one simulated event in the crew training apparatus for causing event-related conversation between the at least two crew members. This embodiment facilitates the causing and subsequent analysis of specific events timing, wherein the correlation coefficient again allows a trainer delivering or operating the training event, and/or the crew partaking in the training event, to examine the individual and crew performance levels at these specific, triggered events.

In one embodiment from the interface, different scenarios can be chosen by the users (e.g. shipwreck task) to evaluate their skills in different types of environment. In particular the technology can be used with any simulation training system where the trainer can capture voice data between two trainees e.g. marine training simulator.

According to a further aspect of the present invention, there is also provided a set of instructions recorded on a data carrying medium which, when read from the medium and processed by a data processing terminal having audio data processing means, configures the terminal to measure crew member communication skills by performing the data processing steps of recording and storing audio data corresponding to a conversation between at least two crew members during a training session; extracting respective audio data of each crew member from the stored audio data; computing a series of measures for at least one prosodic parameter in each respective audio data extracted; computing a correlation coefficient of the series of measures, wherein the correlation coefficient is indicative of a level of prosodic accommodation between the at least two crew members; inferring and assessing communication skills along a grading system (from poor to excellent).

The invention thus provides a method for objectively measuring communication skills of crew members, specifically one or more parameters representative of prosodic accommodation, which are extracted from the crew members conversation, quantitatively measured and correlated. The method is embodied in a corresponding system, either integrated in or associated with the crew training apparatus, and which processes audio data and outputs a quantitative result calculated from same, understandable in relation to and rateable against a numeric scale, rather than a subjective opinion. The crew training apparatus may be any selected from the group comprising aircraft simulators, helicopter simulators, armoured vehicle simulators, maritime vessel simulators, submarine simulators. Simulators can mean either dedicated simulation environments or desktop computer devices running simulated training environments.

According to another aspect of the present invention, and regarding communication skills, prosodic accommodation levels at global and dynamic levels provide an objective metric of the crew members' vocal performance or cooperative behaviour and may be used to infer crew behaviour (such as such as crew quotient, communication performance, coordination, cooperation, crew balance, individual effort, active listening, dominance, adaptability, leadership/followership, stress recovery, interpersonal relationship, group climate).

In one embodiment there is provided a system and method of measuring crew member communication skills with an audio data processing terminal interfaced with a crew training apparatus, comprising the steps of:

recording and storing audio data corresponding to a conversation between at least two crew members during a training session;

extracting respective audio data of each crew member from the stored audio data;

inferring levels of communication skills between the at least two crew members by computing a series of measures for at least one prosodic parameter in each respective audio data extracted, for computing a correlation coefficient of the series of measures, wherein the correlation coefficient is indicative of a level of prosodic accommodation between the at least two crew members; and computing a level of communication skills based on the previous computed metrics, using statistical modelling techniques.

Other aspects of the invention are as described herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE DRAWINGS

There will now be described by way of example a specific mode contemplated by the inventors. In the following description, numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

The inventors have realized that prosodic accommodation can be used for purposes of evaluating crew performance, and can be leveraged within software in order to give an objective rating of vocal communication, both at a crew level and at the individual level. Prosodic accommodation has been the subject of research for a number of years. However, the manner in which the inventors are applying it and the methods used to measure it disclosed herein advantageously result in a method of measuring communicative efficiency in a quantified, thus objective, manner, in any field. Furthermore, the technique advantageously allows for the provision of both crew and individual measures, thus training outcomes and instructions provided to each crew member is enhanced with objective feedback that can be provided both as part of their collective and individually. In addition, the technique advantageously allows for the provision of communication skills at both global and local levels (i.e. for the whole interaction and at specific events in the interaction such as decision making/stressful events).

In a specific example described herein, the purpose is to enhance current assessment procedures of pilot crew communication skills that are provided by Crew Resource Management (CRM) training. Incidents and accidents in the aviation sector can be costly in terms of loss of human life, machinery damaged or destroyed and financial loss via insurance claims. The invention is therefore expected to have particular relevance to the aviation training sector, both as part of mandated CRM training, since fully qualified pilots are required to undergo CRM training twice a year by law, and as part of non-simulator based training tasks, e.g. cooperative crew-based tasks for assessing communication skills. The objective evaluation of communication skills based on the prosodic accommodation measuring technique of the invention can be used to improve current CRM practice, both in training and operational environment.

Figure 1:
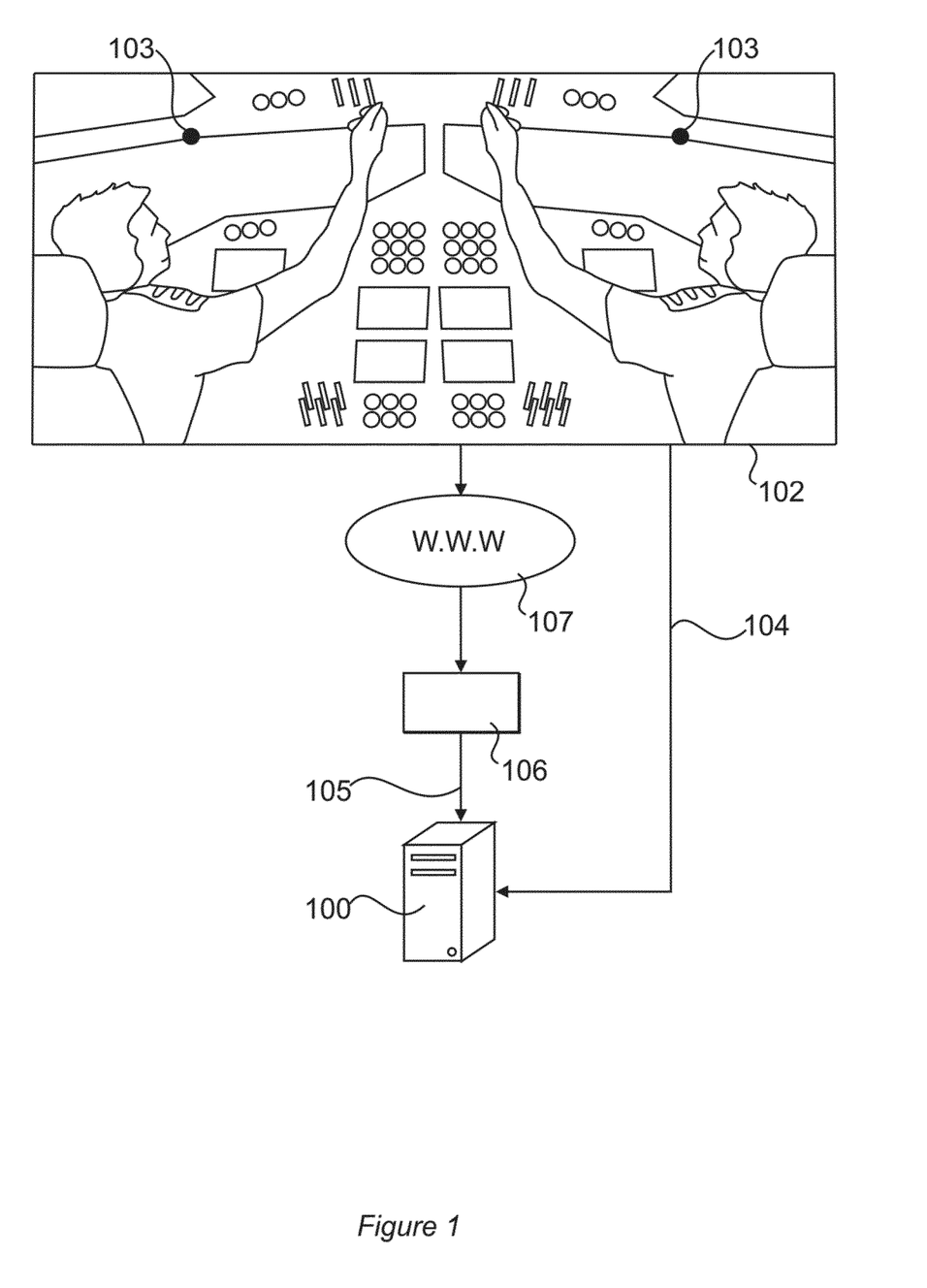
FIG. 1 illustrates a crew training environment comprising a simulator interfaced with a data processing terminal, in which crew members interact and provide audio data.
Figure 2:
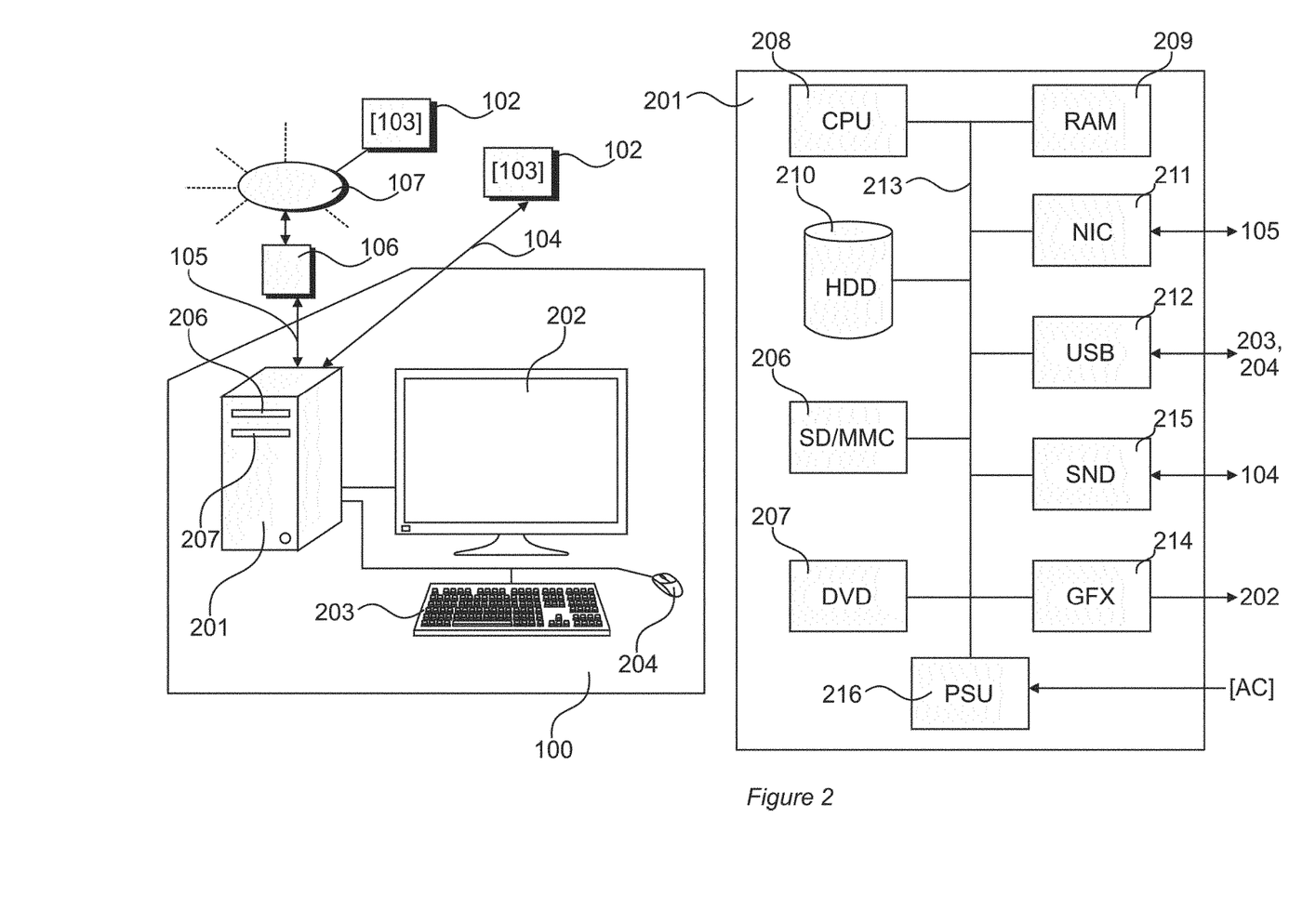
FIG. 2 is a logical diagram of typical hardware architecture of the data processing terminal shown in FIG. 1, including memory means.

With reference to FIGS. 1 and 2, an example embodiment of a system according to the invention is shown, which includes at least a first data processing terminal 100 configured for measuring prosodic accommodation between two crew members $101_1$, $101_2$, in the example aircraft pilots, undergoing training in a flight simulator apparatus 102. The simulator 102 includes an intercom or radio system 103 through which the pilots communicate with one another and optionally with a trainer, who observes their performance and/or parameterises the flight simulator apparatus 102 substantially in real-time. The terminal 100 is operatively interfaced 104 with the simulator 102 and radio system 103 of same, for recording, storing and processing voice data from the crew members 101 taking part in the training exercise.

It will be readily understood by the skilled person from the foregoing, that the above configuration is provided by way of example only, and that many alternative configurations for operably interfacing the terminal 100 with the simulator 102 to achieve audio data connectivity therebetween may be implemented. In particular, the present disclosure considers advantageously operably interfacing the terminal 100 with one or more remote simulators 102 via a physical or wireless network connection 105 to a local wired or wireless network router 106 providing connectivity to a Wide Area Network (WAN) such as the Internet 107, to which such remote simulators 102 may likewise be connected.

Generally, the terminal 100 may be any portable or desktop data processing device having audio data processing means and storage means, apt to be interfaced with an audio data feed as described above and to be configured according to the audio data processing method described hereafter. Accordingly, a typical hardware architecture of the data processing terminal 100 is now shown in FIG. 2 in further detail, by way of non-limitative example.

The data processing device 100 is typically a computer configured with a data processing unit 201, data outputting means such as video display unit (VDU) 202, data inputting means such as HiD devices, commonly a keyboard 203 and a pointing device (mouse) 204, as well as the VDU 202 itself if it is a touch screen display, and data inputting/outputting means such as a wired or wireless network connection 205 to a data communication network, a magnetic data-carrying medium reader/writer 206 and an optical data-carrying medium reader/writer 207.

Within data processing unit 201, a central processing unit (CPU) 208 provides task co-ordination and data processing functionality. Sets of instructions and data for the CPU 208 are stored in memory means 209 and a hard disk storage unit 210 facilitates non-volatile storage of the instructions and the data. A network interface card (NIC) 211 provides the interface to the network connection 205. A universal serial bus (USB) input/output interface 212 facilitates connection to the keyboard and pointing devices 203, 204.

All of the above components are connected to a data input/output bus 213, to which the magnetic data-carrying medium reader/writer 206 and optical data-carrying medium reader/writer 207 are also connected. A video adapter 214 receives CPU instructions over the bus 213 for outputting processed data to VDU 202.

Importantly, an audio adapter or soundcard 215 receives analogue audio data from the radio system 103 of the simulator 102 over an input line 104 and, using the memory means 209 and/or memory means specific to the adapter 215 as a buffer, digitises the audio data substantially in real time, then stores the digitised audio data in the HDD 210.

All the components of data processing unit 201 are powered by a power supply unit 216, which receives electrical power from a local mains power source and transforms same according to component ratings and requirements.

Figure 3:
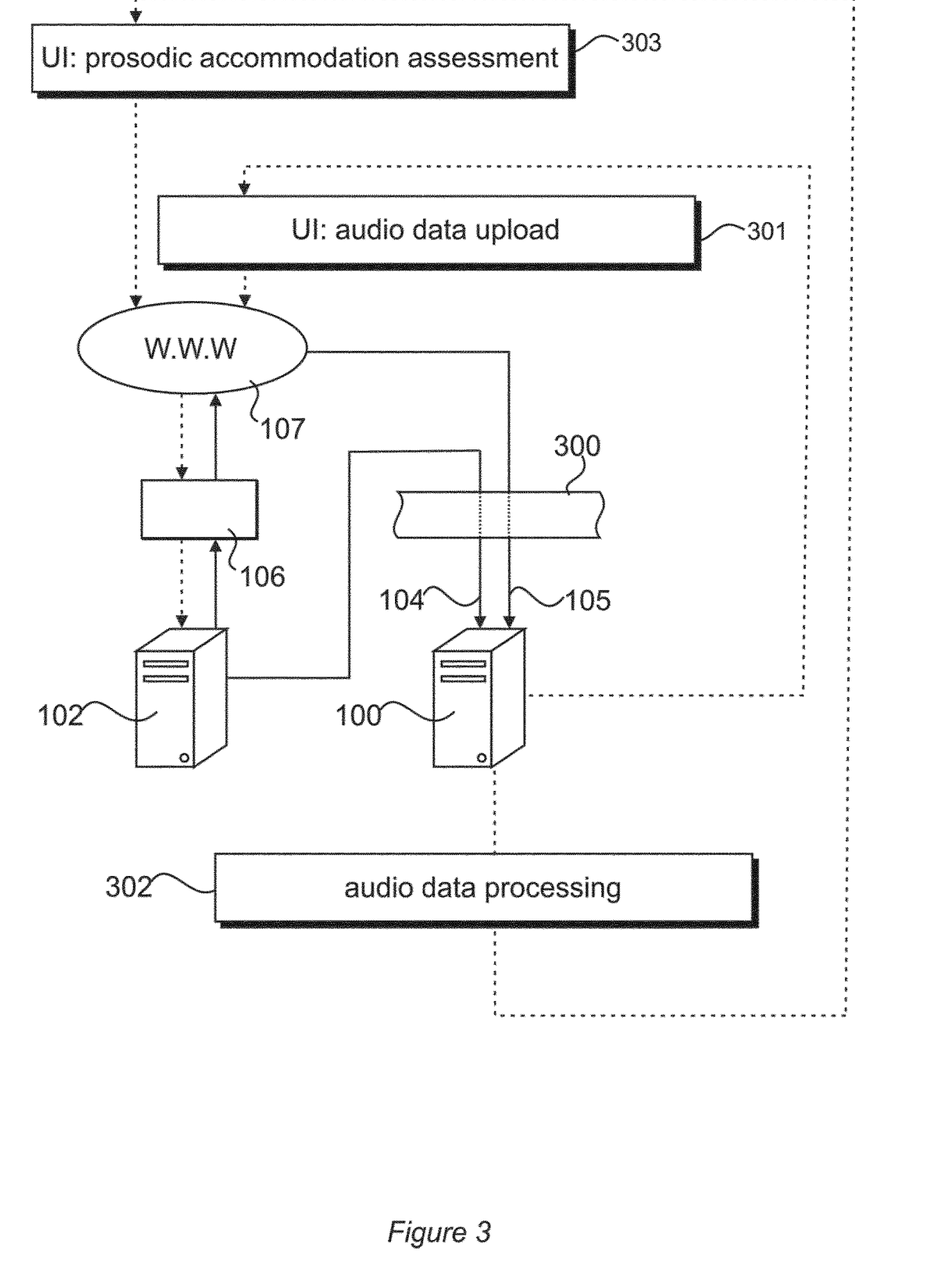
FIG. 3 provides a functional overview of a system according to an embodiment of the invention, processing audio data for analysis in the environment of FIGS. 1 and 2.

FIG. 3 illustrates a high-level overview of the various components composing the system which performs the method of the invention at run time. The terminal 100 generates and outputs a platform-agnostic upload user interface 301 for reception and output at a requesting data processing terminal of, or associated with, the simulator 102.

The user interface 301 is preferably distributed over the WAN 107 by the terminal 100, so that any local or remote requesting data processing terminal 102 may obtain one or more measurements of communication skills from audio data 300 collected thereat from the local interaction of pilots 101$_1$, 101$_2$ and subsequently uploaded to the terminal 100, either via the WAN 107 and eventually the connection 105 if the simulator terminal 102 is remote, or via the line-in audio cable 104 for minimising sound distortion if the simulator terminal 102 is local. The terminal 100 next processes the audio data 300 corresponding to the interactive conversation between the pilots 101$_1$, 101$_2$ and assess crew communication skills (such as crew quotient, communication performance, balance, effort, dominance) therefrom (302), both as a crew and individually. Upon completing the processing, the terminal 100 generates and outputs a platform-agnostic analysis user interface 303 for reception and output at the data processing terminal of, or associated with, the simulator 102 and which uploaded the audio 300.

Figure 4:
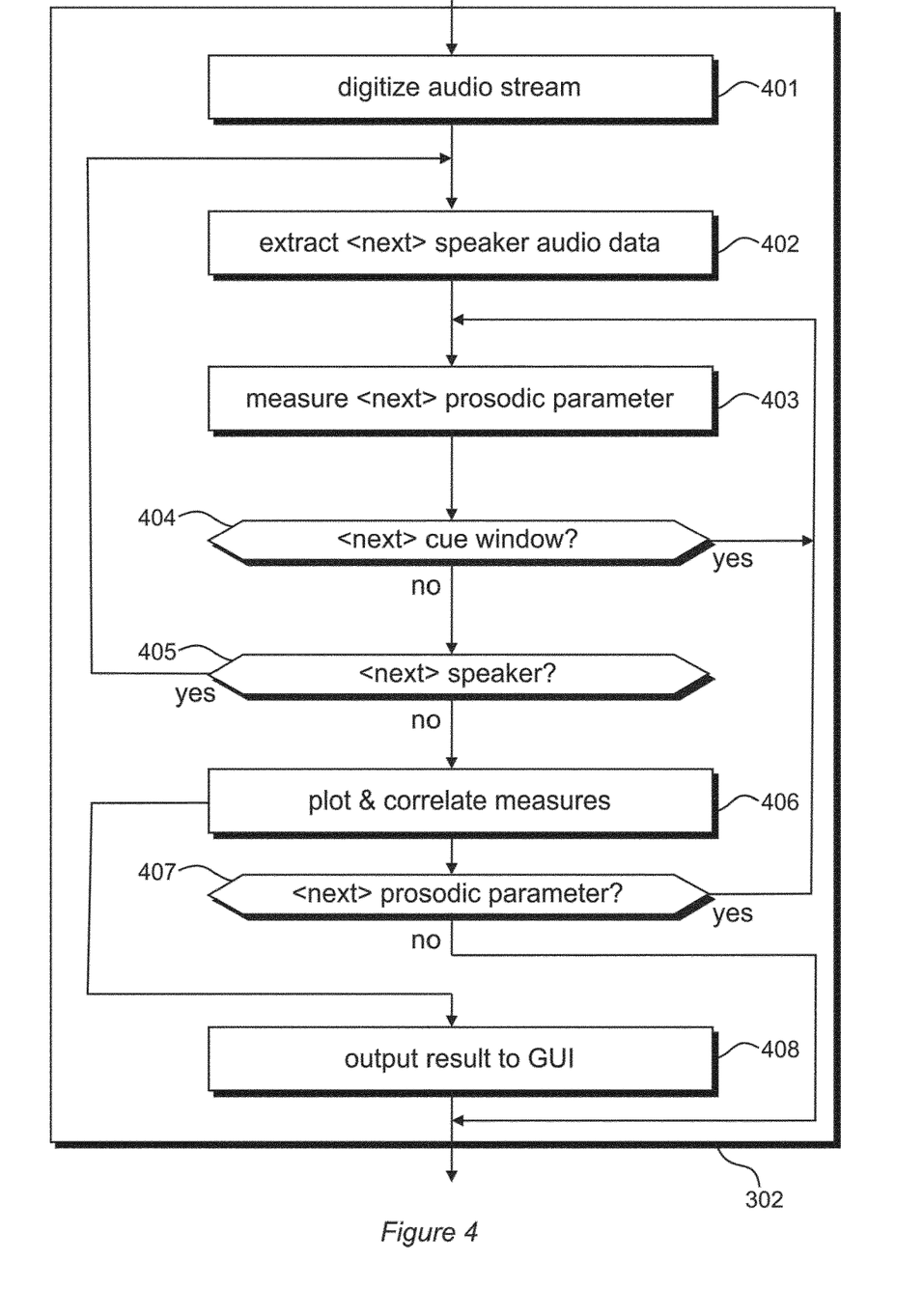
FIG. 4 describes an embodiment of a method performed by the data processing terminal in the system of FIGS. 1 to 3 according to an embodiment of the invention.

With reference to both FIGS. 3 and 4, the prosodic parameters under investigation are pitch level and span, voice intensity level and span, time spent talking/listening/overlapping. The audio data 300 corresponding to the interactive conversation between the pilots 101$_1$, 101$_2$ is first digitised at 401 by an ADC of the soundcard 215, if it was uploaded in analogue form via the line-in 104, and acoustic measurements of the audio signal are obtained using a relevant set of instructions, for instance PRAAT, a free scientific computer software package for the analysis of speech in phonetics designed and developed by Paul Boersma and David Weenink of the University of Amsterdam. It will be appreciated that other software packages can be used, for example MATLAB.

Figure 5:
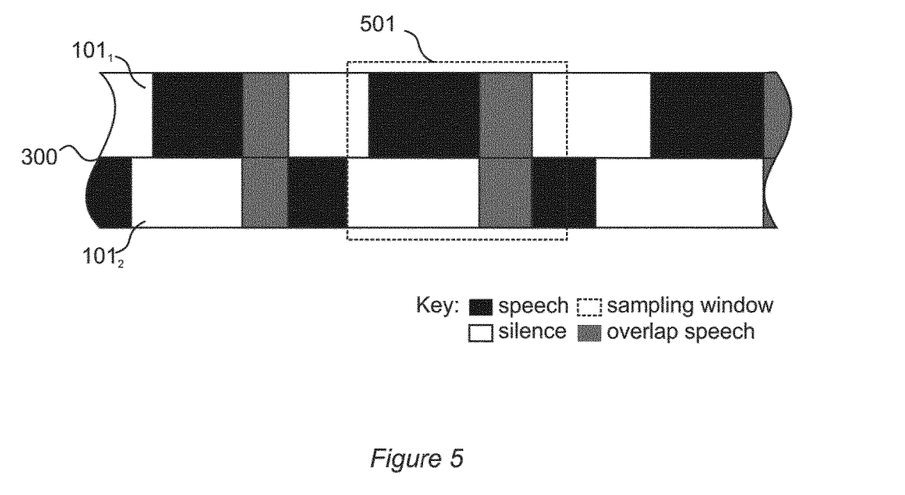
FIG. 5 shows a conversation diagram representative of the respective audio data of the crew members, including prosodic components thereof, processed by the system of FIGS. 1 to 4.

A difficulty encountered when measuring a prosodic parameter of a speech sequence is that it is not time-aligned. With reference to FIG. 5, in order to resolve this difficulty, the Time-Aligned Moving Average (TAMA) method is used, wherein average values of the prosodic parameter are automatically extracted from a series of overlapping windows 501$_N$ of fixed duration (e.g. 20 seconds) using a time step of e.g. 10 seconds, signifying that prosodic parameters are extracted every 10 seconds. It will be appreciated that other methods to the TAMA method can be used. Alternatively, in order to resolve this difficulty, prosodic parameters are automatically extracted from a series of windows, at different time intervals (e.g. every 10 seconds) and which default duration is extended to include both speakers' speech utterances.

Accordingly, audio data 300 corresponding to a first crew member, in the example the first pilot 101$_1$, is extracted at 402. A first prosodic parameter, in the example pitch level, is measured at 403 by calculating the F0-median of the audio data sample, given on a linear scale (i.e. Hertz). A question is then asked at step 404, as to whether the measure corresponding to the next windows 501$_{N+1}$ should be calculated. If the question is answered positively, control returns to the previous step 403 wherein the next measure of the first prosodic parameter is calculated.

Alternatively, the question of step 404 is answered negatively, and a second question is then asked at step 405, as to whether audio data 300 corresponding to a next crew member, in the example the second pilot 101$_2$, should be extracted. If the question is answered positively, control returns to the previous step 402, wherein the audio data 300 corresponding to the second pilot 101$_2$ is accordingly extracted and the first prosodic parameter, in the example pitch level, is measured at 403 by calculating the F0-median, given on a linear scale (i.e. Hertz). It will be appreciated that the extraction of prosodic parameters can be done done for both speakers in the same time, using the same extraction window but their respective data in a parallel process.

Alternatively, the question of step 405 is answered negatively, and control proceeds to step 406, at which the calculated prosodic parameters for both pilots 101$_1$, 101$_2$, in time-aligned series, are correlated for determining the levels of accommodation of the first prosodic parameter, i.e. voice pitch, for the two pilots during the interaction. A question is asked. What method to use? The correlation coefficient computed at this step may be computed according to the Pearson's correlation coefficient technique or the Spearman's correlation coefficient technique. If it is computed with the Pearson's correlation technique, another question is asked. Are there any missing values at specific extraction windows? (i.e. cases where one pilot is not talking). If the question is answered positively, interpolation values may be computed, using existing interpolation methods. If the levels of prosodic accommodation is computed with the Spearman's correlation coefficient technique, the interpolation computing phase is not necessary: it is expected that the coefficient is equal to substantially zero during non-accommodation phases, i.e. periods during which little to no cooperation exists between the pilots, and that the coefficient becomes positive (up to 1) when the two pilots adapt their prosodic characteristics to each other, expectedly during collaborative phases, with periods of high stress extended to affect the coefficient. To decide whether strength of accommodation between the pilots is significant, rather than due to sampling fluctuations, a Fisher transformation may be further applied to the correlation coefficient during step 406. To calculate crew balance (individual effort on accommodating prosodically to the conversational partner), Area Under the Curve is computed and provides a crew balance score for each individual.

Figure 6:
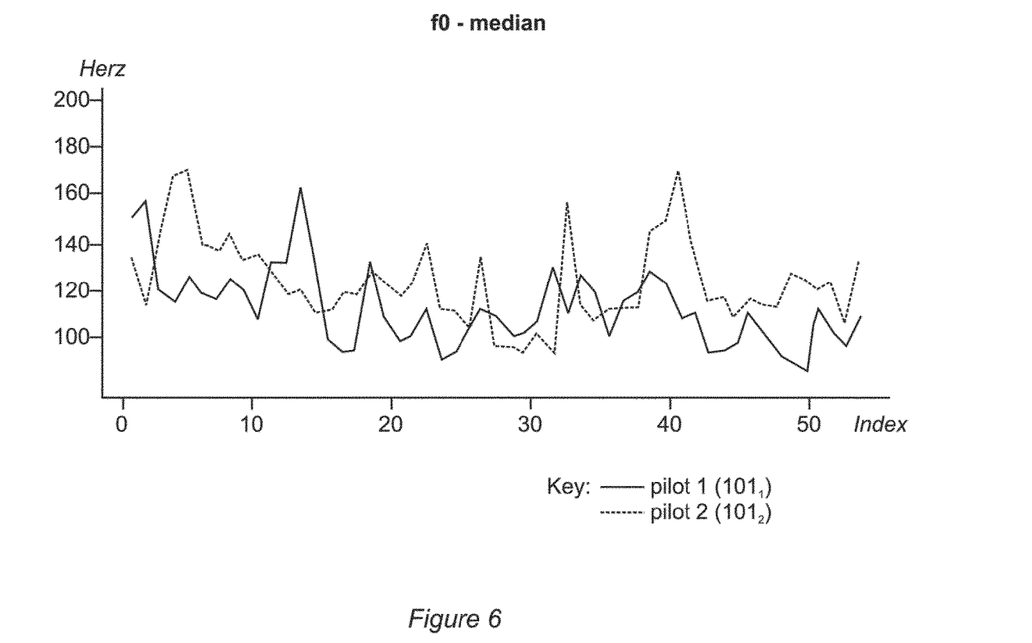
FIG. 6 shows a time-aligned series of prosodic audio data extracted from the audio data shown in FIG. 5 with the system of FIGS. 1 to 4 and processed therewith.

At step 407, the correlation of step 406 for the first prosodic parameter, voice pitch of the pilots $101_1$, $101_2$ is output to the analysis graphic user interface 303 and FIG. 6 shows an example of corresponding time series of f0-median average values (represented here in Hertz) obtained for the two pilots' conversation, which the analysis user interface 303 may display on visual display means 202 of the simulator or trainer terminal 102.

Further to completing step 406, a question is also asked at step 408, as to whether a further prosodic parameter should be measured and, if the question is answered positively, control returns to step 402 as described hereinbefore. For instance, a second parameter in the example is voice span, which is measured at the next iteration of step 403 by calculating the log 2(F0max−F0min) of the audio data sample, given this time on a logarithmic scale (i.e. octave). Using the same logic, still further prosodic parameters may be measured, such as the voice intensity which may be calculated as the root mean square (RMS) amplitude (rms−Int) and standard deviation Intensity (sd−Int), and eventually output at step 407. Alternatively, the question of step 408 is answered negatively and a next audio data 300 corresponding to further, later interactive conversation between the pilots $101_1$, $101_2$ may be first digitised at 401, and so on and so forth. All prosodic parameters can be extracted at the same time.

An alternative embodiment considers calculating the correlation coefficient and its Fisher transformation were for the entire conversation, then for individual sections, in order to measure temporal variations of accommodation. Calculating the coupling of the two time series over time allows for detecting phases of accommodation and non-accommodation. To calculate temporal variations of prosodic accommodation, a series of windows 501 of a fixed length (e.g. 20 points) and a time step of 5% of the window's length may be used. The window length depends on the prosodic parameter extraction window length. The longer the prosodic parameter extraction window length, the longer the prosodic accommodation computation window length. Calculating the temporal variations of prosodic accommodation allows one to give an estimation of the dynamics of an individual's communication skill over time.

Prosodic accommodation is thus used herein for providing an objective measurement of crew performance (or how well two people communicate, i.e. cooperate, coordinate and dynamically adjust their behaviour to one another) in simulation-based training as well as operational environment. The operational environment can be any environment where interaction between two or more people needs to be analysed for training purposes. Within the context of an audio data processing method, it provides a rating at different time intervals which allow the dynamics or evolution of crew performance levels throughout the interaction to be visualised, and therefore can be used to assess how crew members efficiently communicate at specific stressful events. It provides an objective measurement for trainers to augment their own evaluation, and allows crew members, in the example pilots $101_1$, $101_2$ to better identify points at which poor communication occurred. The data can be replayed at specific events (e.g. instances of very good vs. bad communication. In addition, the data can be stored and provide a company a history of their employee's communication performance and best matches. It can also be used by a company to set their standards in terms of expected non-technical communication skills.

Figure 7:
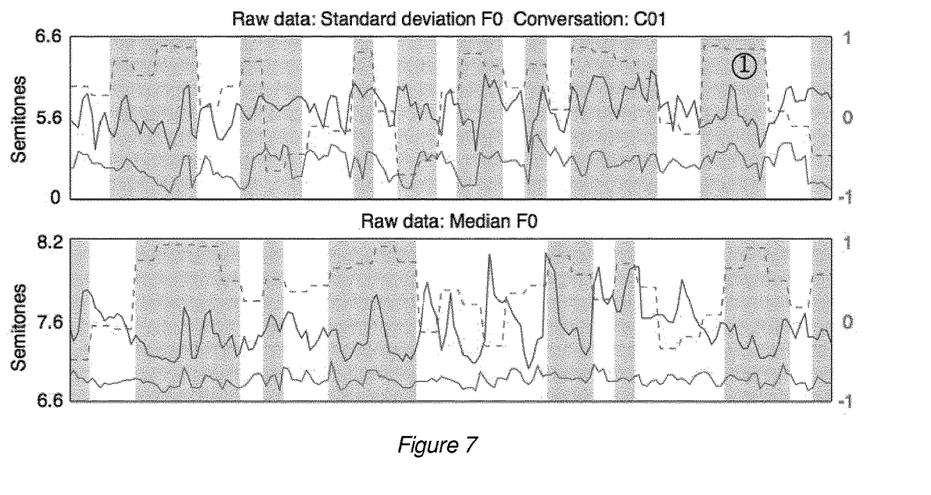
FIG. 7 provides a dynamic representation of prosodic accommodation levels, computed from data shown in FIG. 6.
Figure 8:
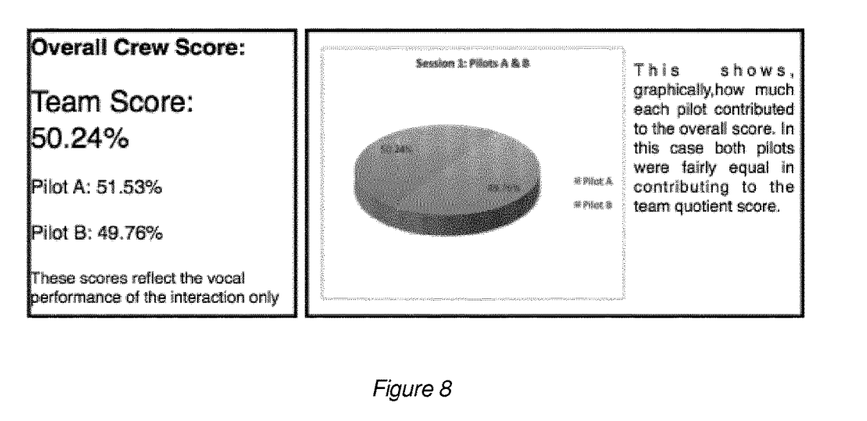
FIG. 8 provides objective metrics of individual and crew vocal performance/crew communication skills, globally and at different time intervals, inferred from data shown in FIG. 7.

FIG. 7 shows phases of high levels of prosodic accommodation are dynamically highlighted in red, low levels in green. The red line represents prosodic accommodation measurements at different time intervals. FIG. 8 shows communication skills as inferred from prosodic accommodation levels during a shipwreck task.

It will be appreciated that the term 'crew member' in the context of the present invention should be interpreted broadly to cover any team member operating in a team environment and the term should be afforded the broadest possible interpretation.

The embodiments in the invention described with reference to the drawings generally comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method of measuring crew member communication skills with an audio data processing terminal interfaced with a crew training apparatus, comprising the steps of:
   recording and storing audio data corresponding to a conversation between at least two crew members during a training session-;
   extracting respective audio data of each crew member from the stored audio data;
   computing a series of measures for at least one prosodic parameter in each respective audio data extracted;

computing a correlation coefficient of the series of measures, wherein the correlation coefficient is indicative of a level of prosodic accommodation between the at least two crew members; and computing an objective rating of a level of communication skills based on the previous computed metrics, using statistical modelling techniques;

wherein the step of computing the series of measures comprises the further step of periodically sampling the respective audio data in a moving time window, which default length is extended to include the speech utterance of each crew member in its entirety.

2. The method according to claim 1, wherein the at least one prosodic parameter is selected from the group comprising crew member voice pitch level, crew member voice span, crew member voice intensity level, crew member voice intensity span, time spent talking, silent and overlapping.

3. The method according to claim 2, wherein a voice pitch level of each crew member is extracted by calculating an] F0 median of the respective audio data.

4. The method according to claim 2, wherein a voice span of each crew member is extracted by calculating a log 2 (F0 max−F0 min) of the respective audio data.

5. The method according to claim 2, wherein a voice intensity level and span of each crew member is extracted by calculating a root mean square amplitude and standard deviation of the respective audio data.

6. The method according to claim 2, wherein the number and duration of conversation pauses is extracted by calculating number and duration silences within one speaker's speech and wherein the minimum duration threshold for silent duration is defined at 200 ms.

7. The method according to claim 1, wherein the time spent talking versus silent is extracted by calculating amount of silent versus speech periods based on a Binary Voice Activity Detection method.

8. The method according to claim 1, comprising the further step of normalising the respective audio data by a log operation and an additional z-score transformation.

9. The method according to claim 1, comprising the further step of triggering at least one simulated event in the crew training apparatus for causing event-related conversation between the at least two crew members.

10. A system for measuring crew member communication skills, comprising:
a crew training apparatus having audio capturing means;
a data processing terminal interfaced with at least the audio capturing means and further comprising:
audio signal processing means for recording and storing audio data corresponding to a conversation between at least two crew members during a training session;
means for extracting respective audio data of each crew member from the stored audio data, for computing a series of measures for at least one prosodic parameter in each respective audio data extracted, for computing a correlation coefficient of the series of measures, wherein the correlation coefficient is indicative of a level of prosodic accommodation between the at least two crew members; and for computing an objective rating of a level of communication skills based on the previous computed metrics, using statistical modelling techniques; wherein the computing the series of measures comprises periodically sampling the respective audio data in a moving time window, which default length is extended to include the speech utterance of each crew member in its entirety.

11. The system according to claim 10, further comprising a network over which the crew training apparatus and the data processing terminal are connected to one another.

12. The system according to claim 10, wherein the at least one prosodic parameter is selected from the group comprising crew member voice pitch level, crew member voice span, crew member voice intensity level, crew member voice intensity span, number of conversation pauses, duration of conversation pauses, time spent talking and time spent silent.

13. The system according to claim 10, further comprising a user interface adapted to trigger at least one simulated event in the crew training apparatus for causing event related conversation between the at least two crew members.

14. A set of instructions recorded on a non-transitory data carrying medium which, when read from the medium and processed by a data processing terminal having audio means, configures the terminal to measure crew member communication skills by performing the data processing steps of recording and storing audio data corresponding to a conversation between at least two crew members during a training session; extracting respective audio data of each crew member from the stored audio data; computing a series of measures for at least one prosodic parameter in each respective audio data extracted; computing a correlation coefficient of the series of measures, wherein the correlation coefficient is indicative of a level of prosodic accommodation between the at least two crew members; and computing an objective rating of a level of communication skills based on the previous computed metrics, using statistical modelling techniques; wherein the step of computing the series of measures comprises the further step of periodically sampling the respective audio data in a moving time window, which default length is extended to include the speech utterance of each crew member in its entirety.

15. A method of measuring crew member communication skills with an audio data processing terminal interfaced with a crew training apparatus, comprising the steps of:
recording and storing audio data corresponding to a conversation between at least two crew members during a training session;
extracting respective audio data of each crew member from the stored audio data;
infering levels of communication skills between the at least two crew members by computing a series of measures for at least one prosodic parameter in each respective audio data extracted, for computing a correlation coefficient of the series of measures, wherein the correlation coefficient is indicative of a level of prosodic accommodation between the at least two crew members; and
computing an objective rating of a level of communication skills based on the previous computed metrics, using statistical modelling techniques, wherein the step of computing the series of measures comprises the further step of periodically sampling the respective audio data in a moving time window, which default length is extended to include the speech utterance of each crew member in its entirety.

16. A simulator, comprising:
a simulation-based or operational environment including a user interface;

a crew training apparatus configured to trigger a simulated event at the user interface for causing an event-related conversation between at least two crew members in the environment;

an audio capturing device; and a data processing terminal interfaced with the audio capturing device, the data processing terminal comprising:

an audio signal processing module configured to record and store audio data corresponding to the event-related conversation between the at least two crew members;

an audio data extraction module configured to:
extract respective audio data of each crew member from the stored audio data,
compute a series of measures of at least one prosodic parameter in each respective audio data extracted,
compute a correlation coefficient of the series of measures, wherein the correlation coefficient is indicative of a level of prosodic accommodation between the at least two crew members, and
compute an objective rating of a level of communication skills based on the previous computed metrics.

* * * * *

UNITED STATES PATENT AND TRADEMARK OFFICE
CERTIFICATE OF CORRECTION

PATENT NO. : 10,152,899 B2
APPLICATION NO. : 14/909044
DATED : December 11, 2018
INVENTOR(S) : Brian Vaughan and Celine De Looze Page 1 of 1

It is certified that error appears in the above-identified patent and that said Letters Patent is hereby corrected as shown below:

In the Claims

Column 13, Line 34, remove space between "200" and "ms"

Signed and Sealed this
Twenty-fifth Day of June, 2019

Andrei Iancu
*Director of the United States Patent and Trademark Office*